(12) United States Patent
Oquendo et al.

(10) Patent No.: US 9,403,569 B2
(45) Date of Patent: *Aug. 2, 2016

(54) UNIVERSAL MOUNTING DEVICE FOR ONE OR MORE ACCESSORIES AND METHOD OF USING SAME (71) Applicants: Marcos Oquendo, Miami, FL (US); Brian Wadey, Sumner, WA (US)

(72) Inventors: Marcos Oquendo, Miami, FL (US); Brian Wadey, Sumner, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/857,953

(22) Filed: Sep. 18, 2015

(65) Prior Publication Data
US 2016/0001840 A1 Jan. 7, 2016

Related U.S. Application Data (63) Continuation of application No. 14/202,340, filed on Mar. 10, 2014, now Pat. No. 9,139,246.

(60) Provisional application No. 61/777,713, filed on Mar. 12, 2013.

(51) Int. Cl.
B62J 11/00 (2006.01)
B62J 7/06 (2006.01)
(Continued)

(52) U.S. Cl.
CPC .. *B62J 11/00* (2013.01); *B62J 7/06* (2013.01); *B60R 11/04* (2013.01); *B62J 2099/0033* (2013.01)

(58) Field of Classification Search
CPC .... B60R 11/00; B60R 11/04; B60R 11/0211; B60R 11/0241; B60R 11/0258; B62J 11/00; B62J 11/06; B62J 2099/0033

USPC ......... 224/420, 441, 448, 452, 453, 546, 564, 224/181, 413, 929; 396/422, 419; D12/114
See application file for complete search history.

(56) References Cited

U.S. PATENT DOCUMENTS

| 1,425,190 | A | * | 8/1922 | Fitz Gerald | ............. | B60Q 1/24 224/413 |
| D88,229 | S | | 11/1932 | Hamm | | |
| D224,085 | S | | 7/1972 | Cuva | | |

(Continued)

FOREIGN PATENT DOCUMENTS

DE 102011055483 5/2013
FR 2868034 9/2005

OTHER PUBLICATIONS

Feisol. Feisol Bicycle Mount. Jan. 10, 2013. [Retrieved on Jun. 20, 2014]. Retrieved From Internet: <https://web.archive.org/web/20130110033957/http://www.feisoleurope.com/feisol-bicycle-mount-P-84.html>.

(Continued)

*Primary Examiner* — Justin Larson
(74) *Attorney, Agent, or Firm* — Reed Smith LLP; Mark T. Vogelbacker (57) ABSTRACT

A device for removably mounting an accessory to a vehicle includes a chassis. The chassis includes a first end, an opposing second end, at least one leg extending therebetween, and an accessory interface located proximate the first end of the chassis. The leg includes at least one hole extending therethrough. At least one fastening mechanism extends into at least a portion of the hole of the leg. At least one accessory mount is configured to releasably engage at least a portion of the accessory interface of the chassis.

19 Claims, 10 Drawing Sheets

(51) Int. Cl.
  *B62J 99/00* (2009.01)
  *B60R 11/04* (2006.01)

(56) References Cited

U.S. PATENT DOCUMENTS

| | | | |
|---|---|---|---|
| 4,473,177 | A | 9/1984 | Parandes |
| D318,607 | S | 7/1991 | Reid et al. |
| 5,260,731 | A | 11/1993 | Baker |
| 5,355,746 | A | 10/1994 | Lin |
| D370,193 | S | 5/1996 | Shull |
| D374,167 | S | 10/1996 | Scholl |
| D433,616 | S | 11/2000 | Fischer |
| D544,565 | S | 6/2007 | Campbell |
| D569,713 | S | 5/2008 | Sandidge |
| D594,739 | S | 6/2009 | Lee |
| D618,085 | S | 6/2010 | Lin et al. |
| 8,267,418 | B1 | 9/2012 | Chuang |
| 8,708,205 | B2 | 4/2014 | Wotton |
| 8,757,460 | B1 | 6/2014 | Barnes |
| 8,770,608 | B1 | 7/2014 | Chamberlain |
| 2001/0039850 | A1 | 11/2001 | Masui |
| 2008/0283704 | A1 | 11/2008 | Hsu |
| 2010/0171832 | A1 | 7/2010 | Solida |
| 2010/0214793 | A1 | 8/2010 | Retief |
| 2010/0264184 | A1 | 10/2010 | Retief |
| 2011/0221161 | A1 | 9/2011 | Ludovici et al. |
| 2012/0091179 | A1 | 4/2012 | Wolton |
| 2014/0061271 | A1 | 3/2014 | Tate |

OTHER PUBLICATIONS

International Search Report and Written Opinion in PCT Application No. PCT/US2014/022487, Jul. 28, 2014.

Notice of Allowance in U.S. Appl. No. 29/467,008, dated May 11, 2015.

* cited by examiner

UNIVERSAL MOUNTING DEVICE FOR ONE OR MORE ACCESSORIES AND METHOD OF USING SAME

CROSS-REFERENCE TO RELATED APPLICATIONS

The present application claims priority to U.S. application Ser. No. 14/202,340, filed Mar. 10, 2014 and entitled "Universal Mounting Device for Personal Accessories," which claims priority to U.S. Provisional Application No. 61/777,713, filed Mar. 12, 2013 and entitled "Universal Mounting Device for Personal Accessories," both of which are incorporated herein by reference in their entirety.

BACKGROUND

The present disclosure relates generally to a universal mounting device and, more particularly, to an apparatus for and method of mounting one or more accessories to a location and/or an object, such as a motorized or non-motorized vehicle.

Portable devices, such as mobile phones, have become increasingly relied upon by individuals on a daily basis. Such devices or accessories are typically designed for ease of portability, and can often be stored in a pocket or bag of the user. Users often wish to temporarily or permanently mount such portable devices on a wide range of locations and/or equipment, such as a bicycle.

Since technology constantly evolves, portable devices of new and altered designs are frequently introduced into the market. Such state-of-the-art devices typically have new and/or unique mounting mechanisms. Accordingly, users wishing to adopt such new portable devices typically are required to comply with the device's mechanism(s) and/or unique structure for affixing the device to a particular location or equipment. Often, this requires that the user purchase and install new mounts to the desired location and/or equipment.

Therefore, it would be desirable to provide a more robust and more adaptable system for mounting portable devices to various types of locations and/or equipment. It is further desirable to provide a mounting system that can quickly be adapted to suit the mounting requirements of currently available and new portable devices without a large-out-of-pocket expense to the user. The device of the present application accomplishes the above and other objectives.

BRIEF SUMMARY

In one aspect, the present disclosure is directed generally to a device for removably mounting an accessory to a vehicle. The device includes a chassis having a first end, an opposing second end, at least one leg extending therebetween, and an accessory interface located proximate the first end of the chassis. The leg includes at least one hole extending therethrough. At least one fastening mechanism extends into at least a portion of the hole of the leg. At least one accessory mount is configured to releasably engage at least a portion of the accessory interface of the chassis.

In another aspect, the present disclosure is directed to a combination including a vehicle, an accessory, and a device for removably mounting the accessory to the vehicle. The device includes a chassis having a first end, an opposing second end, at least one leg extending therebetween, and an accessory interface located proximate the first end of the chassis. The leg includes at least one hole extending therethrough. At least one fastening mechanism extends into at least a portion of the hole of the leg. At least one accessory mount is configured to releasably engage at least a portion of the accessory interface of the chassis.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings various illustrative embodiments. It should be understood, however, that the invention is not limited to the precise arrangements and instrumentalities shown. In the drawings.

DETAILED DESCRIPTION

Certain terminology is used in the following description for convenience only and is not limiting. The words "lower,"

"bottom," "top" and "upper" designate directions in the drawings to which reference is made. Unless specifically set forth herein, the terms "a," "an" and "the" are not limited to one element but instead should be read as meaning "at least one." The terminology includes the words noted above, derivatives thereof and words of similar import.

Referring to the drawings in detail, wherein like reference numerals indicate like elements throughout, FIGS. 1A-3B illustrate a universal mounting device ("UMD" or "device"), generally designated 10, according to an embodiment of the present disclosure. The UMD 10 may removably or permanently attach one or more accessories 12 (see FIGS. 8-10) to a location and/or an object 14 (see FIGS. 8-10). The assessor 12 may be a mobile or cellular phone, computer tablet, a personal digital assistant ("PDA"), a Mpeg-1 audio layer 3 ("MP3") player, flashlight (see FIG. 10), navigation or global positioning satellite ("GPS") unit (see FIGS. 8-10), gaming unit, and the like. The object 14 may be a bicycle (see FIGS. 8-10), scooter, tricycle, stroller, golf cart, boat, all-terrain vehicle ("ATV"), snowmobile, personal watercraft, motorcycle, recreational vehicle ("RV"), personal mobility or transportation device (e.g., a SEGWAY® or a wheelchair), shopping cart, car, train, bus, personal protection device (e.g., a helmet), forklift, aircraft, industrial truck, point of sale or cash register, and the like, while the location may be a wall, ceiling, bannister, railing, pole, or the like.

The UMD 10 may be a single contact mount or a dual contact mount that includes a generally elongated frame or chassis 1. At least one or more separate and spaced-apart chassis caps 2 may removably or permanently attach to at least a portion of the chassis 1. Each chassis cap 2 may be coupled to the chassis 1 by at least one or more fastening mechanisms, mounting hardware or fasteners 3, such as a screw or bolt. The mounting hardware 3 may be head cap screws, or the like. The head cap screws may be M4×0.7" attaching hardware.

Figure 1A:
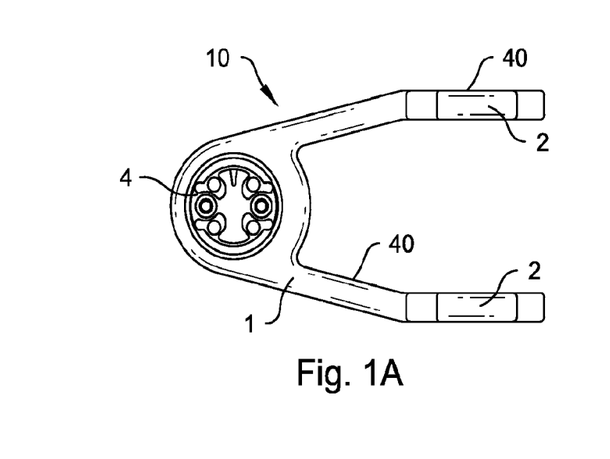
FIG. 1A is a top plan view of a universal mounting device according to an embodiment of the present disclosure.

The chassis caps 2 may be at least substantially equal or identical in size, shape and/or configuration. As shown in FIGS. 1B-2A, 3A and 3B, an inner or bottom surface of each chassis cap 2 may be concave and/or define a semi-circular area. The chassis caps 2 may be machined to at least reduce or eliminate sharp edges by applying a radius/edge break on all outer periphery surfaces. The radius/edge break may be approximately 0.062. As shown in FIGS. 1D and 3B, to attach one of the chassis caps 2 to the chassis 1, the mounting hardware 3 may be inserted at least generally, if not exactly, perpendicularly to a bottom surface of the chassis 1, through threaded (or non-threaded) holes 3a in the chassis 1, and into threaded bore holes 2a in the chassis cap 2. The threading of the bore holes 2a may be a M4×0.7 thread specification. Alternatively, each chassis cap 2 may be pivotably attached to a portion of the chassis 1, or only a portion of each chassis cap 2 may be removably attachable to the chassis 1, while another portion of each chassis cap 2 may be fixedly attached and/or integrally formed with the chassis 1.

Figure 7A:
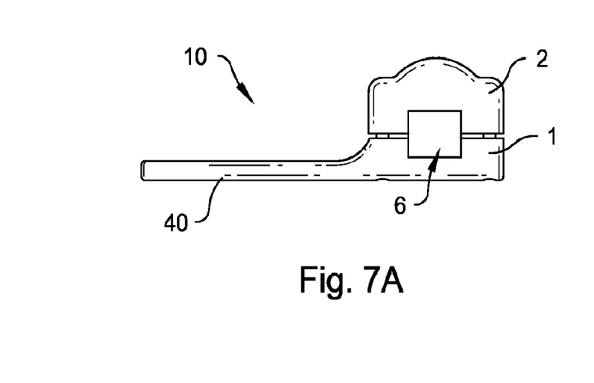
FIG. 7A is a side elevation view of a universal mounting device according to still a further embodiment of the present disclosure.
Figure 7B:
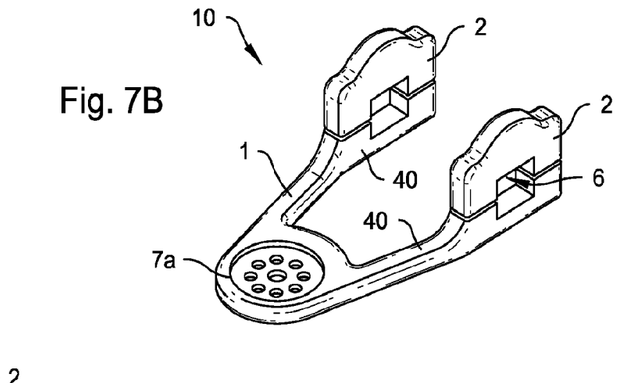
FIG. 7B is a front perspective view thereof.
Figure 7C:
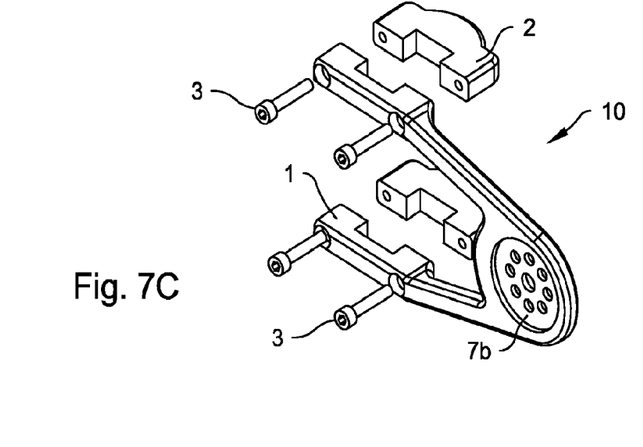
FIG. 7C is a partially exploded bottom perspective view thereof.
Figure 8:
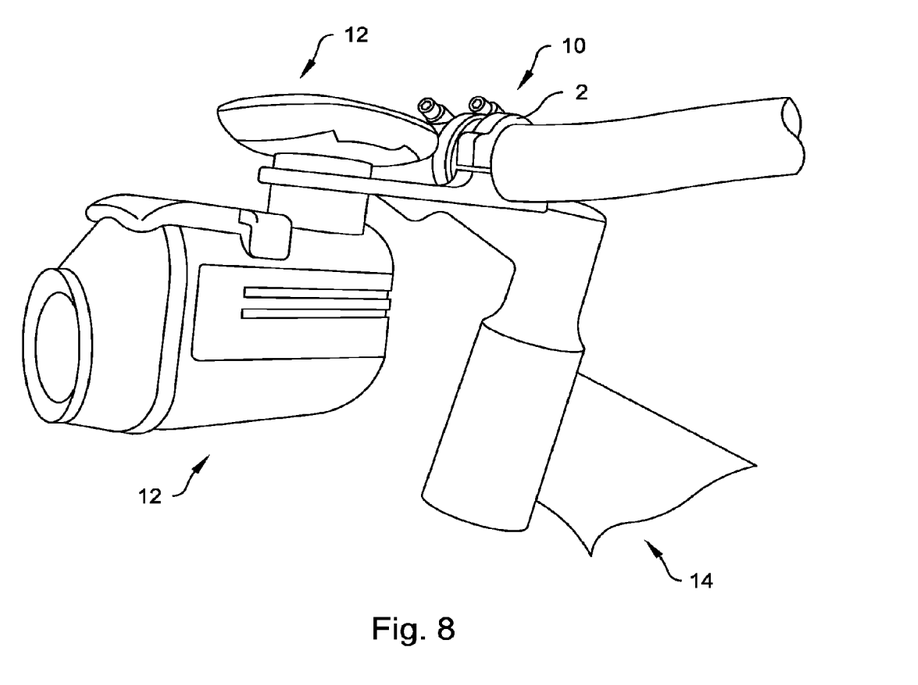
FIG. 8 is a side perspective view of the universal mounting device shown in FIG. 1 attaching two accessories to handlebars of a bicycle.
Figure 9:
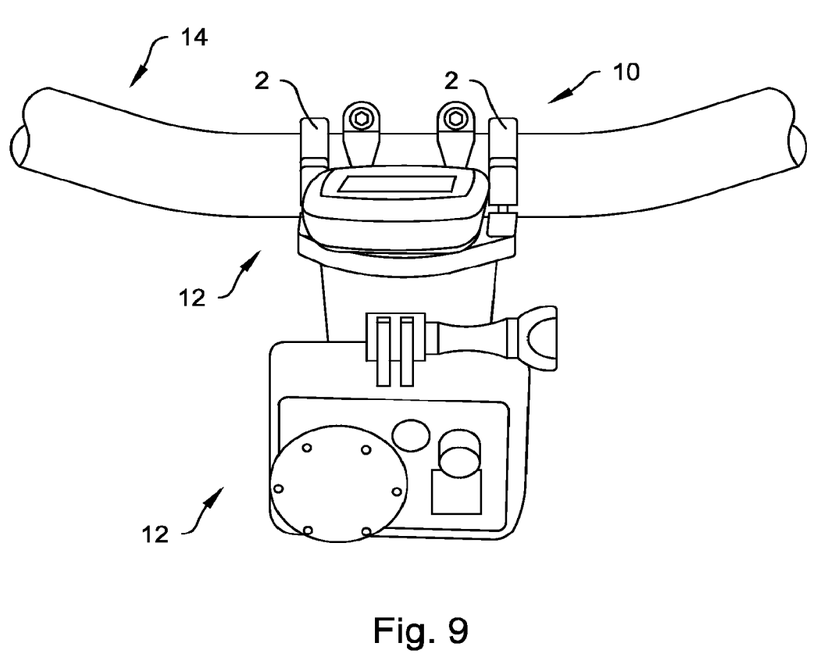
FIG. 9 is a front perspective view of the universal mounting device shown in FIG. 1 attaching two accessories to handlebars of a bicycle.
Figure 10:
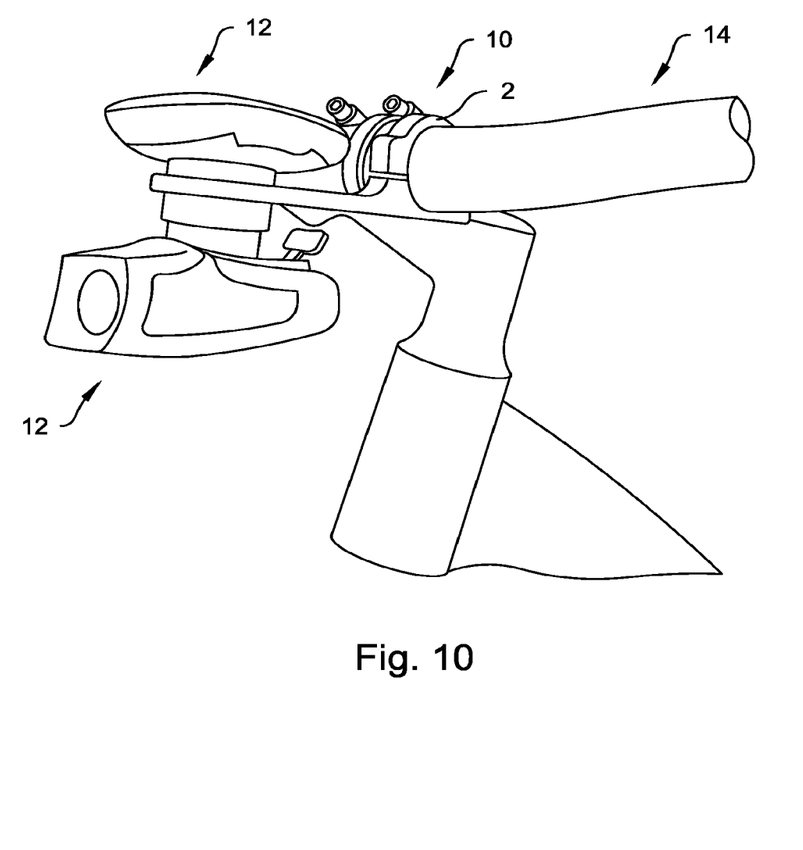
FIG. 10 is another side perspective view of the universal mounting device shown in FIG. 1 attaching two accessories to handlebars of a bicycle.

When properly attached or "closed" (see FIGS. 1B, 1C, 2A and 3A), at least a portion of the chassis 1 and a bottom surface of the chassis cap(s) 2 may define a hollow, generally rounded attachment area or passageway 6 for mounting the UMD 10 to a location and/or a portion of the object 14, such as onto the handlebars of a bicycle (see FIGS. 8-10). Various configurations, sizes, and/or shapes for the attachment area(s) 6 may be created by varying the size of the chassis 1 and the chassis cap(s) 2. For example, each attachment area 6 may have a generally square (see FIGS. 7A-7C), triangular or rectangular (see FIGS. 7A-7C) cross-sectional shape. As shown in FIG. 1C, the UMD 10 may have two spaced-apart and aligned attachment areas 6, which allows a handlebar to easily pass therethrough while providing stability to the UMD 10 when mounted to a bicycle 14, for example. At least three different sizes of the attachment area(s) 6 may be provided to adapt to specific tubing size (22.2 mm, 25.4 mm and 31.8 mm). Furthermore, other attaching/mounting solutions may be utilized instead or in place of the attachment area(s) 6, including, but not limited to, flush mount, magnetic mount, and Quick Release Pin Mount.

The UMD 10 may directly attach to one or more of the accessories 12. One or more accessories 12 may be mounted directly onto a top surface of a first portion 7a (see FIGS. 2A and 3A) of the chassis 1 and one or more accessories 12 may be mounted directly onto an opposing, bottom surface of a second portion 7b (see FIG. 3B) of the chassis 1. For example, at least one navigation unit 12 may be mounted to the first portion or top mount interface 7a of the UMD 10, while at least one video camera 12 can be mounted to the second portion 7b or bottom mount interface of the UMD 10.

Alternatively, the UMD 10 may indirectly attach to one or more of the accessories 12, such that the UMD 10 may accept one or more types, styles, and/or designs of accessory mounts 4, 5 adapted for use with various types of accessories 12. In particular, first and second accessory mounts 4, 5 may be removably or fixedly attached to at least a portion of the UMD 10, such at the top and bottom mount interfaces 7a, 7b, respectively. Various designs of the first and second accessory mounts 4, 5 may be created and/or configured to interface with a variety of accessories 12. For example, the first accessory mount 4 may be configured to interface with a GARMIN® EDGE mounting surface and simultaneously or subsequently interface with another accessory 12. The first accessory mount 4 may be machined from a polymeric material, such as DELRIN®, to securely mount accessories without damaging their mating surfaces.

Figure 1B:
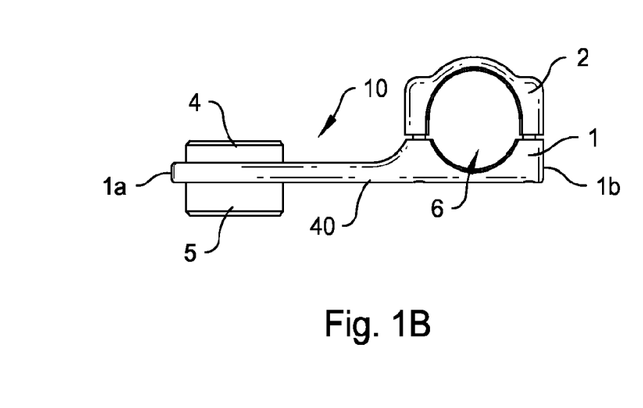
FIG. 1B is a side elevation view thereof.
Figure 1C:
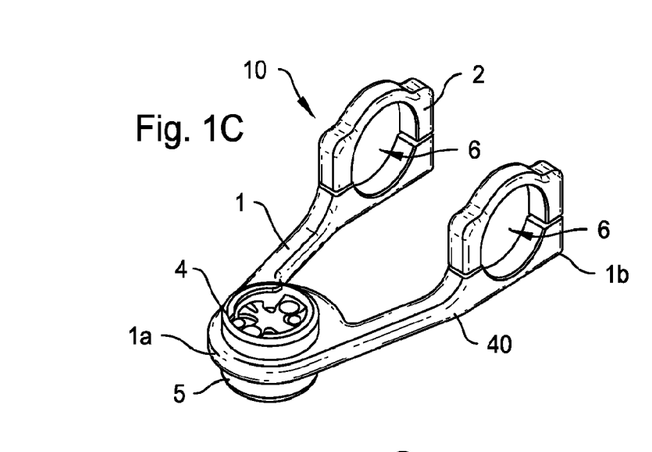
FIG. 1C is a front perspective view thereof.
Figure 2A:
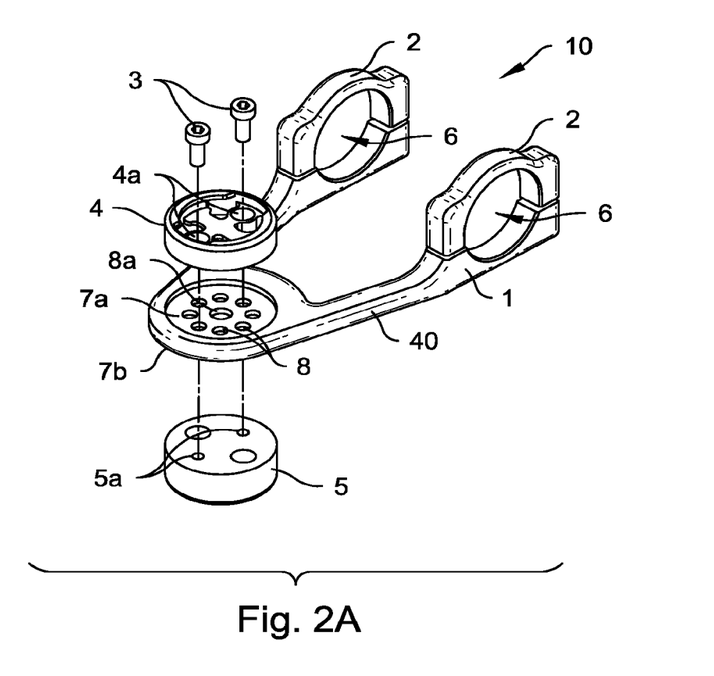
FIG. 2A is a partially exploded top perspective view thereof.
Figure 2B:
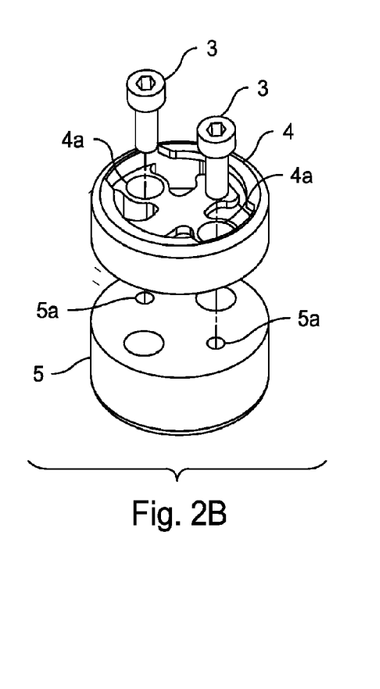
FIG. 2B is an enlarged top perspective view of a portion of the universal mounting device shown in FIGS. 1A-2A.

Referring to FIGS. 1C, 2A and 2B, the first accessory mount 4 may be coupled to a top or upper surface of the chassis 1 at a front end 1a thereof. The second accessory mount 5 may be coupled to an opposing bottom or lower surface of the chassis 1. However, the above-described positioning of the first and second accessory mounts 4, 5 may be reversed. The first accessory mount 4 and the second accessory mount 5 may be positioned in mirror arrangement to one another, with the chassis 1 positioned therebetween. As shown in FIG. 2B, at least a top surface of the first accessory mount 4 may include a predetermined configuration of projections and/or grooves that mate with or receive at least a portion of a variety of different types and/or sizes of the accessories 12. One or more threaded holes 4a may extend through the first accessory mount 4 for receiving at least a portion of one of the mounting hardware 3 or other similar or different fastener. One or more threaded bore holes 5a may extend into a top surface of the second accessory mount for receiving at least a portion of one of the mounting hardware 3 or another similar or different fastener.

Figure 3A:
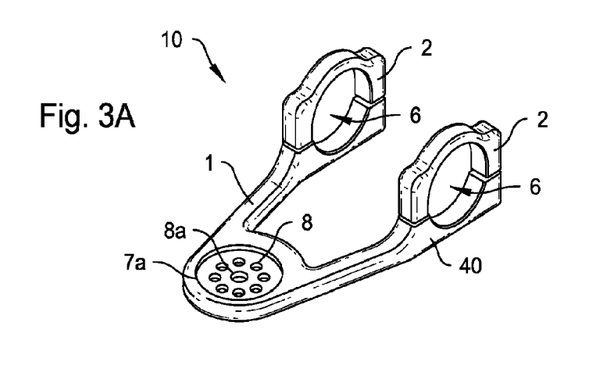
FIG. 3A is a front perspective view of the universal mounting device shown in FIGS. 1A-2A with portions removed for clarity.
Figure 3B:
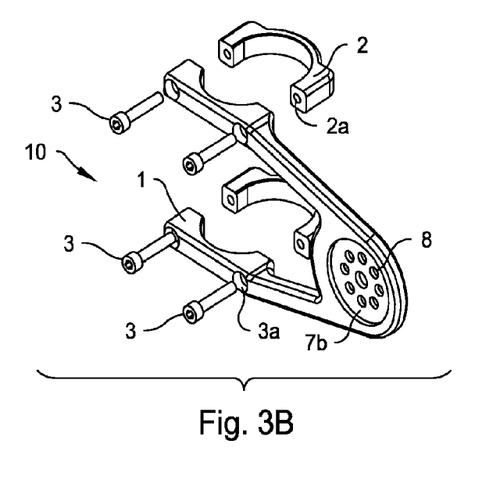
FIG. 3B is a partially exploded bottom perspective view of the universal mounting device shown in FIGS. 1A-2A with portions removed for clarity.

The first and second accessory mounts 4, 5 and the top and bottom mount interfaces 7a, 7b may be generally rounded when viewed from above or below. However, such features are not limited to the size, shape and/or configuration shown and described herein. As shown in FIGS. 2A, 3A and 3B, the top and bottom mount interfaces 7a, 7b may be at least slightly recessed into the top and bottom surfaces, respectively, of the chassis 1, such that the outer periphery of the accessory mount 4 and/or the accessory mount cap 5 may be positioned at least slightly within the recessed area.

Each of the top and bottom mount interfaces 7a, 7b may include a plurality of spaced-apart through holes 8 arranged in a circular pattern around a center hole 8a. The through holes 8 may pass transversely through the chassis 1 from the top mount interface 7a to the bottom mount interface 7b. Each through hole 8 may be sized and/or shape to allow at least a portion of one or the mounting hardware 3 to pass therethrough. As shown in FIG. 2A, the mounting hardware 3 may secure the top accessory mount 4 and the accessory mount cap 5 to the chassis 1 of the UMD 10 at the top and bottom mount interfaces 7a, 7b, respectively. At least a portion of at least one of the mounting hardware 3 may pass through one of the holes 4a in the top accessory mount 4, through the top and bottom mount interfaces 7a, 7b at one of the through holes 8, and is threadably coupled to the accessory mount cap 5 at one of the threaded bore holes 5a.

Alternatively or additionally, the top and bottom mount interfaces 7a, 7b may be reconfigured with other interconnection features, such as threads, or a "feature to feature" locking design, that allows fittings or accessories 12 to be secured to the UMD 10 without additional hardware. Such a design would further reduce weight concerns. Furthermore, the top accessory mount 4 may be capable of attaching one or more accessories 12 to the UMD 10 without the bottom accessory mount 5, and vice-versa. For example, the top accessory mount may be fixedly attached to the UMD 10 by inserting at least a portion of at least one of the mounting hardware 3 through one of the holes 4a in the top accessory mount and into one of the through holes 8. In such a configuration, the bottom mount interface 7b may remain exposed due to the omission of the bottom accessory mount 5.

The chassis 1 may be composed or formed of a metallic material, such as aluminum or an alloy thereof. The aluminum may be an aircraft grade material such as Aluminum 6061 to provide rigidity for the UMD 10. However, the UMD 10 is not limited to any material, and those skilled in the art will understand that other metal and non-metal materials, such as carbon fiber, graphite, steel, a polymeric material and the like, are suitable for use in the UMD 10. An anodized finish may be applied to the UMD 10. However, other finishing processes or no finish may be applied. The chassis 1 may be manufactured as a single, unitary and continuous body, and may be constructed to eliminate sharp edges. The chassis 1 may be machined by applying a radius/edge break of approximately 0.062 on all outer periphery surfaces. The outer periphery of the chassis 1 may be minimized to reduce natural atmospheric resistance. The body of the UMD 10 may be modified/enhanced to aid in the performance by including additional "lighting" holes and/or modifying the edge radii. Furthermore, the overall current size (e.g., length, width and height) and shape of the components of the UMD 10 when assembled may be modified as necessary.

Figure 1D:
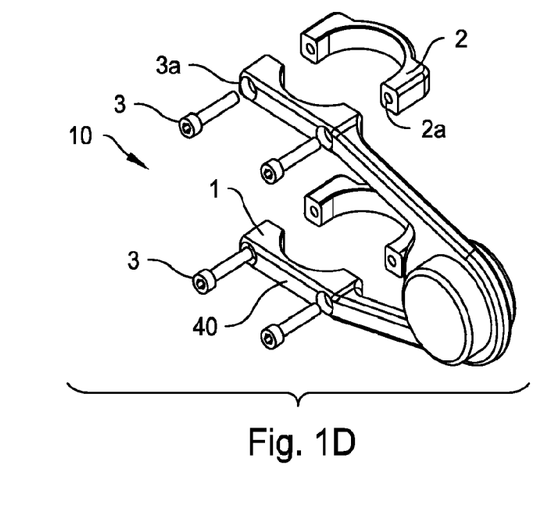
FIG. 1D is a partially exploded bottom perspective view thereof.

As shown in FIG. 1B, the chassis 1 of the UMD 10 may include a first end 1a and an opposing second end 1b. The first end 1a may be at least generally rounded, and may define the top and bottom mount interfaces 7a, 7b. The second end 1b may include or be attached to two spaced-apart arms or legs 40. Each leg 40 may extend between from the first end 1a to the second end 1b of the chassis 1. As shown in FIG. 1A, at least a portion of the legs 40 may extend generally parallel to one another. Alternatively or additionally, the legs 40, or at least a portion thereof, may extend at an angle of greater than zero degrees) (0°) and less than ninety degrees) (90°) with respect to one another. For example, the legs 40 may extend at an angle of approximately thirty degrees) (30°) from one another. The legs 40 may have substantially or exactly the same length. The UMD 10 is not limited to any particular number of legs 40, and may have only one leg 40 (see FIG. 6A-6C), or more than two legs 40 in order to provide additional support contact points. Referring to FIGS. 1B-2A, 3A and 3B, at least a portion of a top surface of each leg 40 may define an arcuate or concave surface having a first radius. At least a portion of the top surface of each leg 40 is configured to couple with the arcuate bottom surface of one of the chassis caps 2 to define the passageway 6.

Figure 4A:
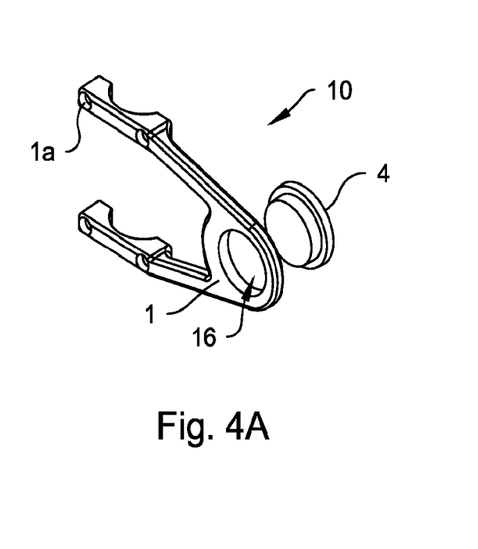
FIG. 4A is a partially exploded bottom perspective view of a universal mounting device according to another embodiment of the present disclosure.

FIG. 4A shows another embodiment of the UMD 10. The present embodiment is substantially similar to the embodiment described in detail above. Description of certain similarities between the two embodiments may be omitted herein for the sake of brevity and convenience, but such omission is not limiting. In the present embodiment, the chassis cap(s) 2 may be omitted, such that the chassis 1 may directly attach to the location and/or object 14 (see FIG. 4A, for example). At least a portion of one of the mounting hardware 3 may be inserted into one of the threaded holes 1a in the chassis 1 and into the location and/or object 14. The location and/or object 14 may include one or more preformed holes (not shown) for receiving at least a portion of one or more of the mounting hardware 3.

In addition, the present embodiment of the UMD 10 may omit the top and bottom mount interfaces 7a, 7b, such that a passageway 16 extends completely through the chassis 10. The passageway 16 may be at least generally, if not exactly, circular when viewed from above and below. The passageway 16 may have a smooth interior peripheral surface (see FIG. 4A), or the passageway 16 may have one or more screw threads, for example. At least a portion of the first accessory mount 4 may be sized, shaped and/or configured to complementarily engage or mate with at least a portion of the passageway 16. The first accessory mount 4 may be retained onto the chassis 1 by a friction fit.

Figure 4B:
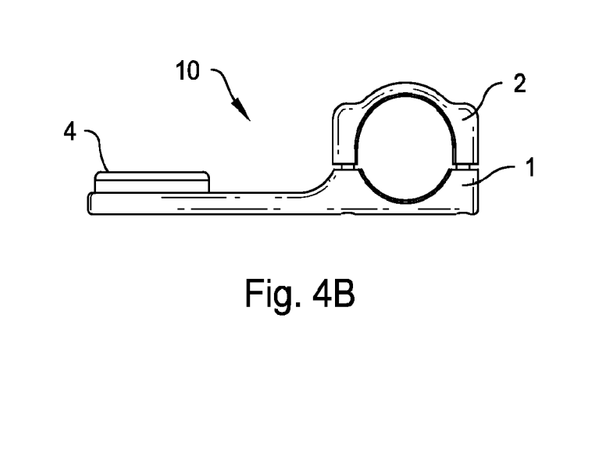
FIG. 4B is a side elevation view of a modified version of the universal mounting device shown in FIG. 4A.
Figure 4C:
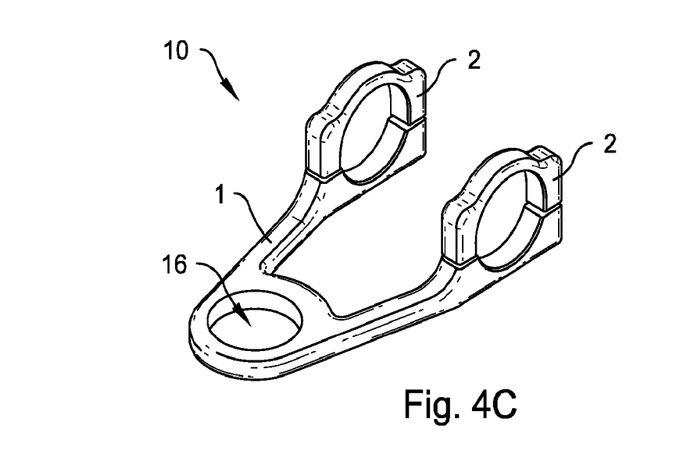
FIG. 4C is a front perspective view thereof.

FIGS. 4B and 4C show a modified version of the UMD 10. The modified version is substantially similar to the embodiments described in detail above. Description of certain similarities between the modified version and the embodiments described above may be omitted herein for the sake of brevity and convenience, but such omission is not limiting. In the modified embodiment, two chassis caps 2 may be used to attach the chassis 1 to the location and/or object 14.

Figure 5A:
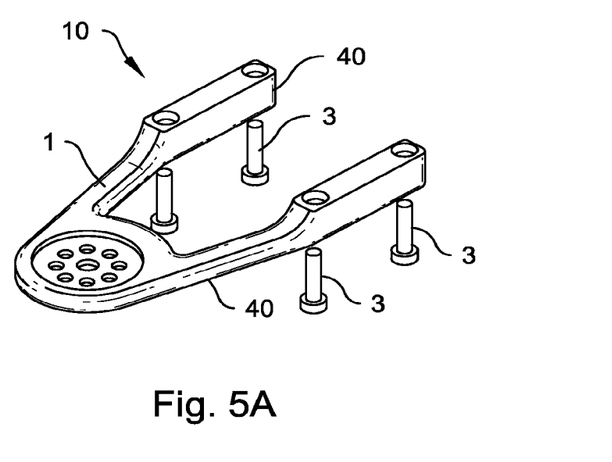
FIG. 5A is a front perspective view of a universal mounting device according to yet another embodiment of the present disclosure.
Figure 5B:
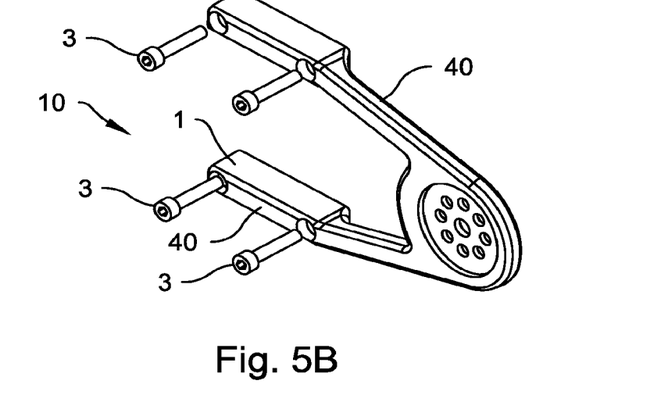
FIG. 5B is a partially exploded bottom perspective view thereof.

FIGS. 5A and 5B show yet another embodiment of the UMD 10, which is substantially similar to the embodiments described in detail above. Description of certain similarities between the embodiments may be omitted herein for the sake of brevity and convenience, but such omission is not limiting. A distinguishing feature of the present embodiment is that at least a portion of the top surface of each leg 40 of the chassis 1 is flat or planar. Such a feature allows the UMD 10 to be quickly and easily attached to a flat surface of a location and/or object 14. For example, the UMD 10 could be flushly mounted beneath a horizontally-extending surface. Similar to the one of the embodiments described above, the present embodiment of the UMD 10 may omit the chassis cap(s) 2 such that at least one and possibly four of the mounting hardware 3 pass through the chassis 1 and into the location and/or object 14 to attach the UMD 10 to the location and/or the object 14.

Figure 6A:
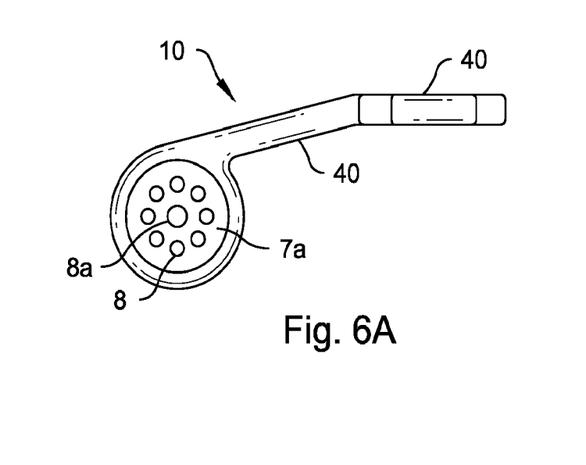
FIG. 6A is a top elevation view of a universal mounting device according to a further embodiment of the present disclosure.
Figure 6B:
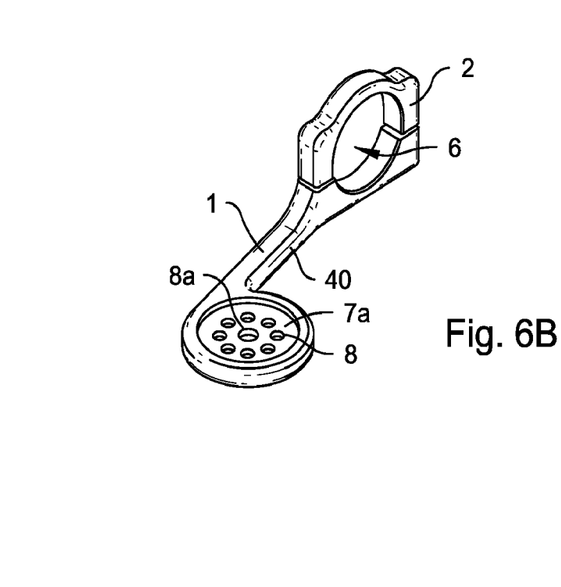
FIG. 6B is a front perspective view thereof.
Figure 6C:
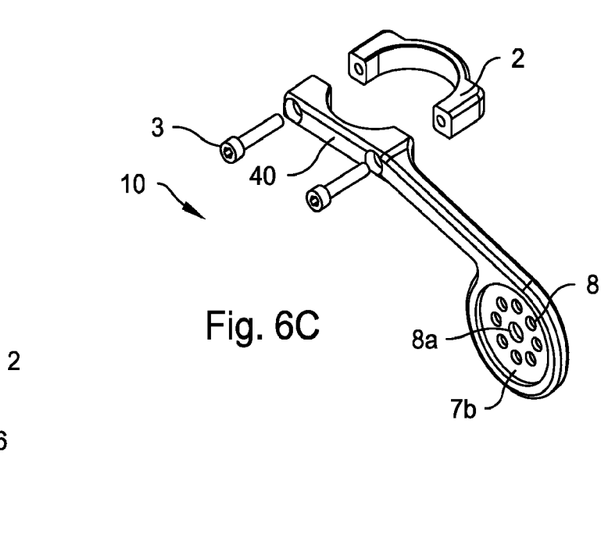
FIG. 6C is a partially exploded bottom perspective view thereof.

FIGS. 6A-6C show a further embodiment of the UMD 10. The present embodiment is substantially similar to the embodiments described in detail above. Description of certain similarities between the embodiments may be omitted herein for the sake of brevity and convenience, but such omission is not limiting. A distinguishing feature of the present embodiment is that the chassis 1 includes only a single leg 40. Thus the UMD 10 of the present embodiment is a single contact mount, which means that the UMD 10 contacts the location and/or object 14 at generally only a single point.

FIG. 7A-7C show still a further embodiment of the UMD 10, which is substantially similar to the embodiments described in detail above. Description of certain similarities between the embodiments may be omitted herein for the sake of brevity and convenience, but such omission is not limiting. A distinguishing feature of the present embodiment is that one or more of the attachment areas 6 have a generally square or rectangular shape. Such a configuration is beneficial when it is desirable to mount or attach the UMD 10 to a location and/or object 14 that has a similar cross-sectional shape.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

We claim:

1. A device for removably mounting an accessory to a vehicle, the device comprising:
   a chassis including a first end, an opposing second end, a first leg, a second leg spaced-apart from the first leg, and an accessory interface located proximate to the first end of the chassis, each of the first and second legs extending between the first end and the second end, the accessory interface including a top surface and an opposing bottom surface, the top surface of the accessory interface being attachable to at least one of a first accessory mount and a first accessory, the bottom surface of the accessory interface being attachable to at least one of a second accessory mount and a second accessory, the first and second legs each including at least one hole extending therethrough;
   at least one cap removably attachable to at least a portion of each leg proximate the second end of the chassis; and
   at least one fastening mechanism extending into at least a portion of the hole of each leg and extending into and engaging at least a portion of the respective cap,
   wherein when each cap is attached to the respective leg, each leg and cap combination form a passageway therebetween, each passageway being configured to receive at least a portion of the vehicle therein for mounting the device to the vehicle.

2. The device according to claim 1, wherein
   each passageway is configured to receive at least a portion of a handlebar of a bicycle therein for mounting the device to the bicycle.

3. The device according to claim 1, wherein the accessory interface includes a passageway extending therethrough, the passageway including one of a smooth interior peripheral surface and a screw thread.

4. The device according to claim 1, wherein at least a portion of each cap defines a concave surface.

5. The device according to claim 4, wherein at least a portion of the each leg defines a concave surface.

6. The device according to claim 1 further comprising:
   at least one fastener extending through each of the accessory mounts to attach each of the accessory mounts to the accessory interface.

7. The device according to claim 6,
   wherein at least a portion of each fastener extends through a first one of the accessory mounts, through the accessory interface and into at least a portion of a second one of the accessory mounts.

8. A combination comprising:
   a vehicle;
   a first accessory;
   a second accessory, each of the first and second accessories being selected from the group consisting of a mobile telephone, a computer tablet, a personal digital assistant, a music player, a flashlight, a navigation unit, and a gaming unit; and
   a device configured to removably mount the accessory to the vehicle, the device comprising:
      a chassis including a first end, an opposing second end, an accessory interface located proximate the first end of the chassis, a first leg, and a second leg, each leg extending between the first and second ends of the chassis, the accessory interface including a first surface and an opposing second surface, the first surface of the accessory interface being attachable to the first accessory, the second surface of the accessory interface being attachable to the second accessory, the chassis further including a first hole spaced-apart from a second hole in each of the first and second legs,
      a first cap and a second cap, each cap being removably attachable to one of the legs proximate the second end of the chassis; and
      at least one fastening mechanism extending into at least a portion of each of the first and second holes, each fastening mechanism extending into and engaging at least a portion of one of the cap,
      wherein when each cap is attached to one of the legs, each respective leg and cap combine to form a passageway therebetween, each passageway being configured to receive at least a portion of the vehicle therein for mounting the device to the vehicle.

9. The combination according to claim 8, wherein the accessory interface includes a passageway extending therethrough, the passageway including one of a smooth interior peripheral surface and a screw thread.

10. The combination according to claim 8, further comprising:
    at least one fastener extending through a first accessory mount to attached the first accessory mount to the accessory interface; and
    at least one fastener extending through a second accessory mount to attached the second accessory mount to the accessory interface.

11. The combination of claim 8, wherein the vehicle is a bicycle having a handle bar.

12. The combination according to claim 11, each passageway is configured to receive at least a portion of the handlebar of the bicycle therein for mounting the device to the bicycle.

13. A device for removably mounting an accessory to a vehicle, the device comprising:
    a chassis including at least one leg and an accessory interface, the accessory interface including a first surface and an opposing second surface, the chassis being configured to engage at least a portion of the vehicle;
    a first accessory mount and a second accessory mount, each accessory mount being configured to engage at least one of the first and second surfaces of the accessory interface; and
    at least one fastener extending through the first accessory mount, through the accessory interface and into at least a portion of the second accessory mount to attach the first and second accessory mounts to the chassis.

14. The device according to claim 13, further comprising;
at least one cap removably attachable to at least a portion of a leg of the chassis proximate a second end of the chassis,
wherein when the cap is attached to the leg, the leg and the cap combine to form a passageway therebetween, the passageway being configured to receive at least a portion of the vehicle therein for mounting the device to a vehicle.

15. The device according to claim 14, wherein at least a portion of the cap defines a concave surface.

16. The device according to claim 15, wherein at least a portion of the at least one leg defines a concave surface.

17. The device according to claim 13, wherein the chassis includes a first leg and a second leg, each leg extending between first and second ends of the chassis, and wherein each leg includes a first hole spaced-apart from a second hole.

18. The device according to claim 17, further comprising:
two caps, each cap being removably attachable to one of the legs,
wherein when each cap is attached to one of the legs, each respective leg and cap combine to form a passageway therebetween, each passageway being configured to receive at least a portion of a handlebar of a bicycle therein for mounting the device to the bicycle.

19. The device according to claim 8, wherein the accessory interface includes a passageway extending therethrough, the passageway including one of a smooth interior peripheral surface and a screw thread.

\* \* \* \* \*